(12) United States Patent
Chung et al.

(10) Patent No.: US 9,154,226 B2
(45) Date of Patent: Oct. 6, 2015

(54) OPTICAL SIGNAL QUALITY MONITORING METHOD AND APPARATUS USING A SOFTWARE-BASED SYNCHRONIZED AMPLITUDE HISTOGRAM

(71) Applicant: Korea Advanced Institute of Science and Technology, Daejeon (KR)

(72) Inventors: Yun Chur Chung, Daejeon (KR); Hyeok Gyu Choi, Daejeon (KR); Jun Ho Chang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 177 days.

(21) Appl. No.: 13/929,110

(22) Filed: Jun. 27, 2013

(65) Prior Publication Data

US 2014/0308034 A1    Oct. 16, 2014

(51) Int. Cl.
*H04B 10/079*    (2013.01)
(52) U.S. Cl.
CPC ............... *H04B 10/07953* (2013.01)

(58) Field of Classification Search
CPC ............. H04B 10/0795; H04B 10/07951; H04B 10/07953
See application file for complete search history.

(56) References Cited

FOREIGN PATENT DOCUMENTS

KR      20040098975     11/2004
KR      100553814       2/2006

*Primary Examiner* — Leslie Pascal
(74) *Attorney, Agent, or Firm* — Joseph H. Kim; JHK Law (57) ABSTRACT

An optical signal quality monitoring apparatus includes an optical detector for directly receiving an optical signal modulated in an optical path and converting the optical signal to an electric signal, an asynchronous sampling unit for asynchronously sampling the electric signal of the optical detector at a reduced speed, and a digital signal processor for monitoring an optical signal quality by finding a synchronized amplitude histogram of data sampled in the asynchronous sampling unit. An optical signal quality monitoring method includes (a) a step of allowing an optical detector to directly receive a modulated optical signal and to convert the optical signal to an electric signal; (b) a step of allowing an asynchronous sampling unit to asynchronously sample the electric signal; and (c) a step of allowing a digital signal processor to monitor an optical signal quality by generating a synchronized amplitude histogram of sampled data.

12 Claims, 8 Drawing Sheets

OPTICAL SIGNAL QUALITY MONITORING METHOD AND APPARATUS USING A SOFTWARE-BASED SYNCHRONIZED AMPLITUDE HISTOGRAM

FIELD OF THE INVENTION

The present invention relates to a method for monitoring a transmission quality of an optical signal and, more particularly, to a method and apparatus for monitoring a quality of an optical signal by acquiring a software-based synchronized amplitude histogram and analyzing the synchronized amplitude histogram.

BACKGROUND OF THE INVENTION

In recent years, a high-level modulation signal such as a quadrature phase-shift keying (QPSK) signal or a quadrature amplitude modulation (QAM) signal is extensively used to increase a transmission capacity per optical fiber.

In order to efficiently manage a next-generation optical network in which the high-level modulation signal is widely used, there is a need to directly monitor a quality of an optical signal in an optical layer. To this end, Korean Registered Patent Publication No. 10-0553814 (published on Feb. 14, 2006) discloses a method for checking the distortion of an optical signal based on a data distribution change caused by a reference voltage variation and a method for monitoring an optical signal-to-noise ratio Q of an optical signal using a non-synchronized amplitude histogram.

Such a conventional method can be realized without having to use a clock signal for synchronization and a high-speed sampling circuit. Thus, the conventional method is economical and applicable regardless of a transmission speed of an optical signal. Recently, it was reported that the conventional method can be applied to a high-level modulation signal such as a QPSK signal, a 16QAM signal or a 6QAM signal. Use of the conventional method makes it possible to monitor not only an optical signal-to-noise ratio but also failure factors of a transmission link, such as a chromatic dispersion (CD) and a polarization-mode dispersion (PMD).

However, an optical signal is asynchronously sampled in the method that makes use of a non-synchronized amplitude histogram. For that reason, the sampled data contains no timing information. Therefore, the signal samples differing in amplitude overlap with each other. This poses a problem in that it is difficult to analyze the non-synchronized amplitude histogram and to extract a suitable parameter indicating a signal quality.

If chromatic dispersions are accumulated in an optical signal, constructive interference and destructive interference occur between continuous symbols. Thus, an increased number of peaks are generated in the non-synchronized amplitude histogram. This makes it difficult to analyze the non-synchronized amplitude histogram.

The method of monitoring a quality of an optical signal using a non-synchronized amplitude histogram is capable of monitoring an optical signal-to-noise ratio and different system failure factors such as a chromatic dispersion and a polarization-mode dispersion. In order to analyze the non-synchronized amplitude histogram, however, the method is applicable only when the optical signal-to-noise ratio is equal to or higher than about 20 dB.

Since data are acquired even in a region where symbol conversion occurs, the distribution of the non-synchronized amplitude histogram varies depending on the rise time of a system and the optical filter existing on a transmission link. Accordingly, the monitoring accuracy is also affected by this factor.

In contrast, if a synchronized amplitude histogram is used, data are acquired at the center of a symbol. This makes it possible to significantly increase the monitoring accuracy. However, a high-speed sampling circuit and a clock-extracting circuit need to be used in order to obtain the synchronized amplitude histogram. For that reason, this method is costly and is not widely used in the art.

SUMMARY OF THE INVENTION

In view of the aforementioned problems inherent in the prior art, it is an object of the present invention to provide an apparatus capable of monitoring a quality of an optical signal by applying a software-based synchronization technology to asynchronously sampled data.

Another object of the present invention is to extract a software-based synchronized clock signal by asynchronously sampling a detected optical signal at a speed far lower than a symbol speed.

A further object of the present invention is to provide a clock signal for accurate synchronization by compensating a difference between a clock frequency of a Fourier-transformed data sample and an aliasing clock frequency.

A still further object of the present invention is to calculate a parameter indicating a quality of an optical signal by analyzing a synchronized amplitude histogram.

A yet still further object of the present invention is to provide a method capable of monitoring a quality of an optical signal over a wide range by asynchronously sampling a detected optical signal and then generating a synchronized amplitude histogram.

According to one aspect of the present invention, there is provided an optical signal quality monitoring apparatus, including: an optical detector for directly receiving an optical signal modulated in an optical path and converting the optical signal to an electric signal; an asynchronous sampling unit for asynchronously sampling the electric signal of the optical detector at a reduced speed; and a digital signal processor for monitoring an optical signal quality by finding a synchronized amplitude histogram of data sampled in the asynchronous sampling unit.

In the present apparatus, the asynchronous sampling unit may include: a sample-and-hold amplifier for sampling the electric signal outputted from the optical detector; and an analog-to-digital converter for converting an analog signal sampled in the sample-and-hold amplifier to a digital signal.

In the present apparatus, the asynchronous sampling unit may be configured to asynchronously sample the electric signal at a speed lower than a symbol speed of the optical signal.

In the present apparatus, the digital signal processor may include: a clock signal extracting unit for extracting a clock signal using a software-based synchronization method; a retiming-and-arranging unit for retiming and arranging sampled data using a clock frequency estimated by the clock signal extracting unit such that the sampled data are inserted into a single symbol period; an amplitude histogram acquiring unit for acquiring a synchronized amplitude histogram using the sampled data positioned at a central region of a symbol while excluding a sample acquired in a region where symbol conversion occur; and a quality calculating unit for calculating a parameter indicating an optical signal quality by analyzing a distribution of the synchronized amplitude histogram acquired in the amplitude histogram acquiring unit.

In the present apparatus, the clock signal extracting unit may be configured to extract a clock frequency of the sampled data by Fourier-transforming the data asynchronously sampled in the asynchronous sampling unit and to extract a clock signal for synchronization by compensating a difference between a clock frequency $f_p$ of the sampled data and an aliased clock frequency $f_a$ generated in a frequency region.

In the present apparatus, the quality calculating unit may be configured to calculate a parameter for deciding one or both of an optical signal-to-noise ratio and a chromatic dispersion which are factors deteriorating the optical signal quality.

In the present apparatus, the optical signal may be modulated by a modulation method selected from the group consisting of M-ary PSK (M-ary Phase-Shift Keying), M-ary DPSK (M-ary Differential Phase-Shift Keying) and M-ary QAM (M-ary Quadrature Amplitude Modulation).

According to another aspect of the present invention, there is provided an optical signal quality monitoring method, including: (a) a step of allowing an optical detector to directly receive a modulated optical signal and to convert the optical signal to an electric signal; (b) a step of allowing an asynchronous sampling unit to asynchronously sample the electric signal; and (c) a step of allowing a digital signal processor to monitor an optical signal quality by generating a synchronized amplitude histogram of sampled data.

In the present method, the step (c) may include: (c-1) a step of allowing a clock signal extracting unit to extract a clock signal by a software-based synchronization method; (c-2) a step of allowing a retiming-and-arranging unit to retime and arrange sampled data using a clock frequency such that the sampled data are inserted into a single symbol period; (c-3) a step of allowing an amplitude histogram acquiring unit to acquire a synchronized amplitude histogram using the sampled data positioned at a central region of a symbol while excluding a sample acquired in a region where symbol conversion occur; and (c-4) a step of allowing a quality calculating unit to calculate a parameter indicating an optical signal quality by analyzing a distribution of the synchronized amplitude histogram acquired in the amplitude histogram acquiring unit.

In the present method, the step (c-1) may include: (c-1-1) a step of Fourier-transforming the data asynchronously sampled in the asynchronous sampling unit; (c-1-2) a step of extracting a clock frequency of the Fourier-transformed sampled data; (c-1-3) a step of extracting an aliasing clock on an aliasing component generated in a frequency region in the step (c-1-1); and (c-1-4) a step of extracting a clock signal for synchronization by compensating a difference between a clock frequency $f_p$ of the sampled data and an aliased clock frequency $f_a$ generated in the frequency region.

With the optical signal quality monitoring apparatus according to the present invention mentioned above, a software-based synchronization technology is applied to asynchronously sampled data. This makes it possible to monitor a quality of an optical signal in a cost-effective manner without having to employ a high-speed sampling circuit and a clock-extracting circuit.

The present invention makes it possible to extract a software-based synchronized clock signal by asynchronously sampling a detected optical signal at a speed far lower than a symbol speed.

The present invention makes it possible to provide a clock signal for accurate synchronization by compensating a difference between a clock frequency of a Fourier-transformed data sample and an aliasing clock frequency.

The present invention makes it possible to evaluate a quality of an optical signal by generating a synchronized amplitude histogram through the use of the central data of a symbol and getting rid of the influence of a dip in a region where symbol conversion occurs.

The present invention makes it possible to accurately calculate a chromatic dispersion indicating a quality of an optical signal and a parameter deciding an optical signal-to-noise ratio, through the use of a synchronized amplitude histogram.

In the optical signal quality monitoring method according to the present invention, it is possible to monitor a quality of an optical signal over a wide range by asynchronously sampling a detected optical signal and then generating a synchronized amplitude histogram. Moreover, it is possible to significantly enhance the monitoring accuracy of an optical signal quality.

DETAILED DESCRIPTION OF THE PREFERRED EMBODIMENTS

Certain preferred embodiments of an optical signal quality monitoring apparatus and method using a software-based synchronized amplitude histogram according to the present invention will now be described in detail with reference to the accompanying drawings.

Figure 1:
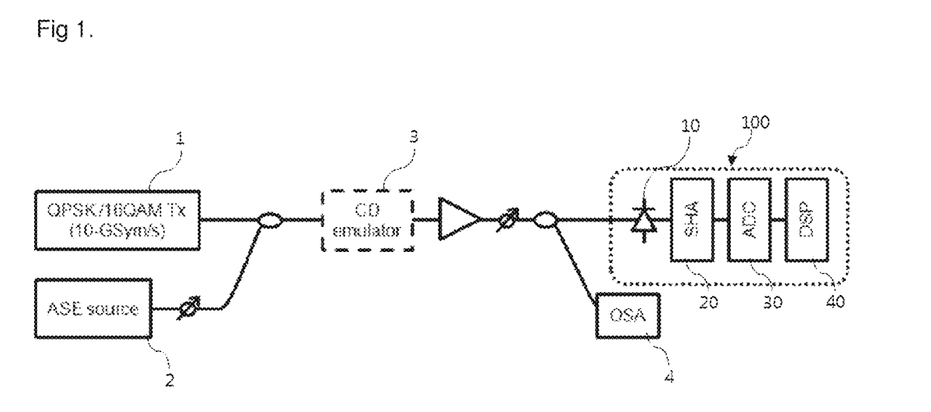
FIG. 1 is a configuration view of a test system including an optical signal quality monitoring apparatus using a software-based synchronized amplitude histogram according to the present invention.

FIG. 1 is a schematic view for explaining an optical signal quality monitoring apparatus using a software-based synchronized amplitude histogram according to an embodiment of the present invention. An optical signal quality monitoring apparatus 100 according to the present invention includes an optical detector 10, an asynchronous sampling unit and a digital signal processor (DSP) 40.

The optical detector 10 serves to directly receive an optical signal modulated in an optical path and to convert the optical signal to an electric signal. In the present embodiment, it is preferred that the optical signal is one of an M-ary PSK (M-ary Phase-Shift Keying) signal, an M-ary DPSK (M-ary Differential Phase-Shift Keying) signal and an M-ary QAM (M-ary Quadrature Amplitude Modulation) signal.

The asynchronous sampling unit serves to asynchronously sample the electric signal of the optical detector 10 at a low speed. In the present embodiment, the asynchronous sampling unit includes a sample-and-hold amplifier (SHA) 20 for sampling an analog electric signal from the optical detector 10 and an analog-to-digital converter (ADC) 30 for converting the analog signal sampled in the sample-and-hold amplifier 20 to a digital signal. The asynchronous sampling unit performs asynchronous sampling at a sampling speed $f_s$ far lower than a symbol speed.

Figure 2:
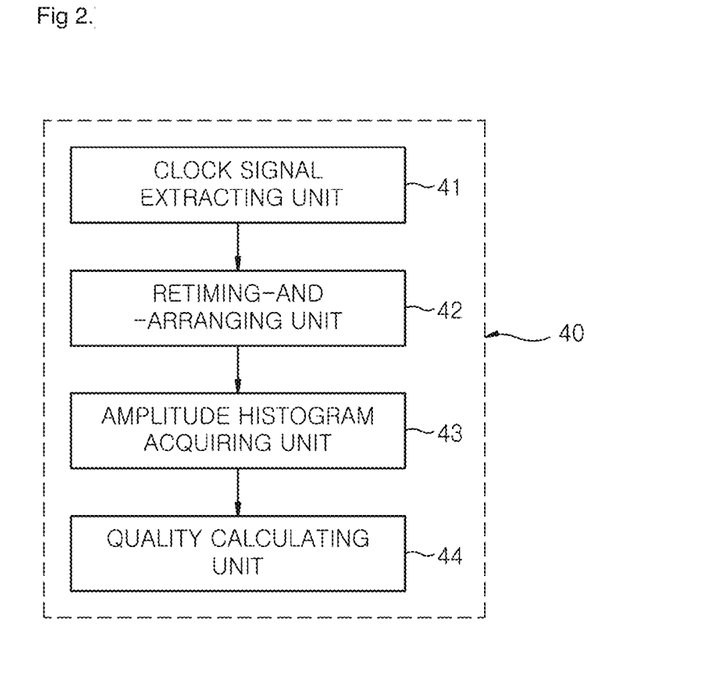
FIG. 2 is a configuration view showing the detailed configuration of a digital signal processor employed in the optical signal quality monitoring apparatus according to the present invention.

The digital signal processor 40 serves to find a synchronized amplitude histogram of sampled data and to monitor an optical signal quality. As shown in FIG. 2, the digital signal processor 40 includes a clock signal extracting unit 41, a retiming-and-arranging unit 42, an amplitude histogram acquiring unit 43 and a quality calculating unit 44.

The clock signal extracting unit 41 serves to extract a clock signal using a software-based synchronization method. In order to extract a clock signal for synchronization, the clock signal extracting unit 41 rapidly Fourier-transforms the data sampled in the asynchronous sampling unit. At this time, a clock component is aliased in a frequency region. The relationship between an aliased clock, a symbol speed of an optical signal and a sampling clock is represented by equation 1:

$$f_a = |(B/f_s) - \text{round}(B/f_s)|$$

where $f_a$ denotes the frequency of the aliased clock, B signifies the symbol speed of the optical signal, and $f_s$ means the frequency of the sampling clock.

In view of the characteristics of the Fourier transformation, the resolution of a frequency which can be expressed by sampling N signals at a speed of $f_s$ and Fourier-transforming the signals is $f_s/N$. Therefore, if an aliased frequency is estimated from a component $f_p$ appearing as a peak in a frequency region, the degree of clock estimation accuracy is limited to $|f_s/N|$.

In the present embodiment, the clock signal extracting unit 41 makes use of phase-reference detection algorithm in an effort to increase the degree of clock estimation accuracy. With this method, the degree of clock estimation accuracy can be increased by finding a difference between the clock frequency $f_p$ approximately calculated by the Fourier transformation and the clock frequency $f_a$ actually aliased and then compensating the difference thus found. More specifically, the component aliased by a band pass filter is first cut out around a peak component having the highest power on a frequency spectrum of sampled data. By reversely Fourier-transforming the aliased component, it is possible to indicate an aliased clock signal having a frequency of $f_s$ on a time domain. If the aliased clock signal is multiplied by two sinusoidal waves having a frequency of $f_s$ and a phase difference of 90 degrees, it becomes possible to know a phase difference between the aliased clock signal having a frequency of $f_s$ and the approximately estimated clock signal having a frequency of $f_p$. The time-dependent change amount of the phase difference is equal to the frequency difference between $f_s$ and $f_p$. It is therefore possible to accurately estimate $f_s$ through the use of the frequency difference.

The retiming-and-arranging unit 42 serves to, using the clock frequency estimated by the clock signal extracting unit 41, retime and arrange the sampled data so that the sampled data can be inserted into a single symbol period.

Figure 3A:
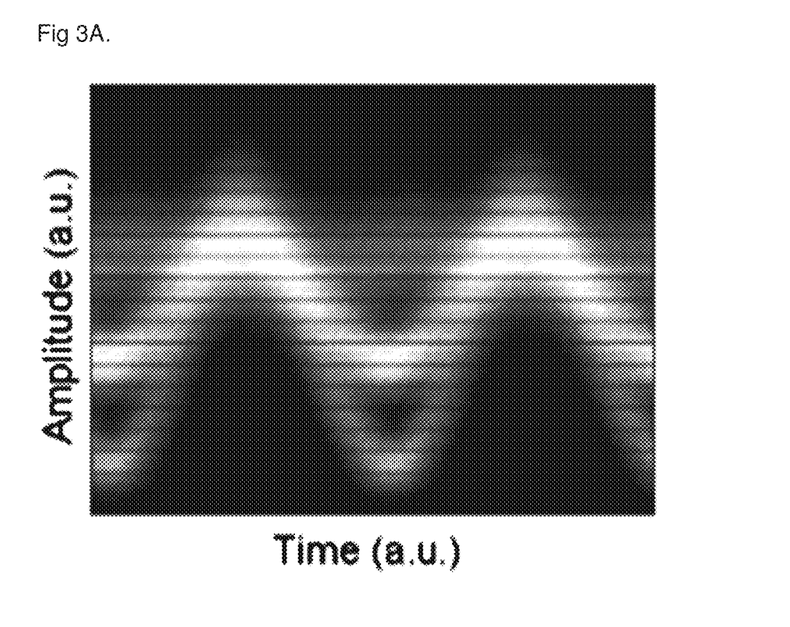
FIGS. 3A and 3B show an eye diagram and a synchronized amplitude histogram of a QPSK signal to which a software-based synchronization method according to an embodiment of the present invention is applied.

FIG. 3A is an eye diagram showing a QPSK signal acquired by rearranging the sampled data in conformity with a symbol period using a clock extracted in the retiming-and-arranging unit 42. If the QPSK signal is created through the use of an IQ modulator, a dip is generated in a region where symbol conversion occurs. The width of the dip varies depending on the rise time of a system. Accordingly, data measured at the center of a symbol need to be used in order to evaluate a signal quality while excluding the influence of the dip.

Figure 3B:
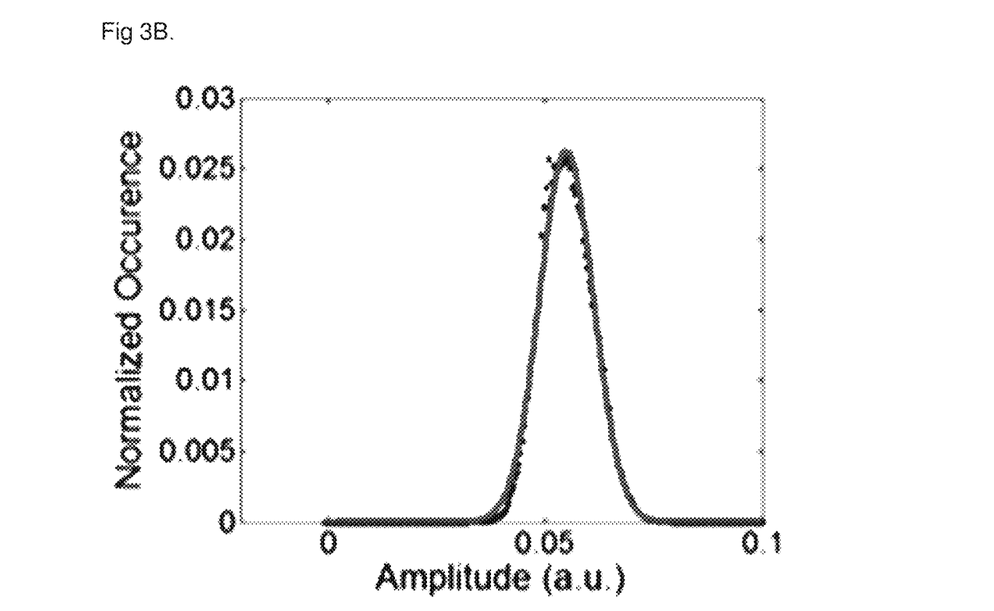

The amplitude histogram acquiring unit 43 serves to acquire a synchronized amplitude histogram using the sampled data positioned at a central region of a symbol while excluding a sample acquired in a region where symbol conversion occur. In the present embodiment, the sampled data are divided into twenty (20) parts along the time axis of the eye diagram. A synchronized amplitude histogram is acquired through the use of a sample positioned in a central region. FIG. 3B illustrates the synchronized amplitude histogram of the QPSK signal.

The quality calculating unit 44 serves to calculate a parameter indicating an optical signal quality by analyzing the distribution of the synchronized amplitude histogram acquired in the amplitude histogram acquiring unit 43. In the present embodiment, the quality calculating unit 44 calculates a parameter for deciding one or both of an optical signal-to-noise ratio and a chromatic dispersion which are factors deteriorating the optical signal quality.

In FIG. 3B, the Gaussian approximate value of the synchronized amplitude histogram is indicated by a solid line. In order to quantitatively estimate the signal quality using the synchronized amplitude histogram, a Q value as a parameter indicating the signal quality is defined by equation 2:

$$Q = \frac{\mu}{\sigma}$$

where $\mu$ denotes the average of Gaussian-approximated amplitude histograms, and $\sigma$ means the standard deviation thereof.

Along with the accumulation of the chromatic dispersions, the amplitude tends to increase in the central region of the eye diagram. Thus, it is possible to monitor the accumulated chromatic dispersions using the eye diagram and the synchronized amplitude histogram. A parameter for quantitatively monitoring the chromatic dispersions, $F_{CD}$, is defined by equation 3:

$$F_{CD} = \frac{\mu_{center}}{\mu_{avg}}$$

where $\mu_{center}$ denotes the average of amplitudes of the samples on the synchronized amplitude histograms, and $\mu_{avg}$ means the average of amplitudes of the total samples.

Figure 4A:
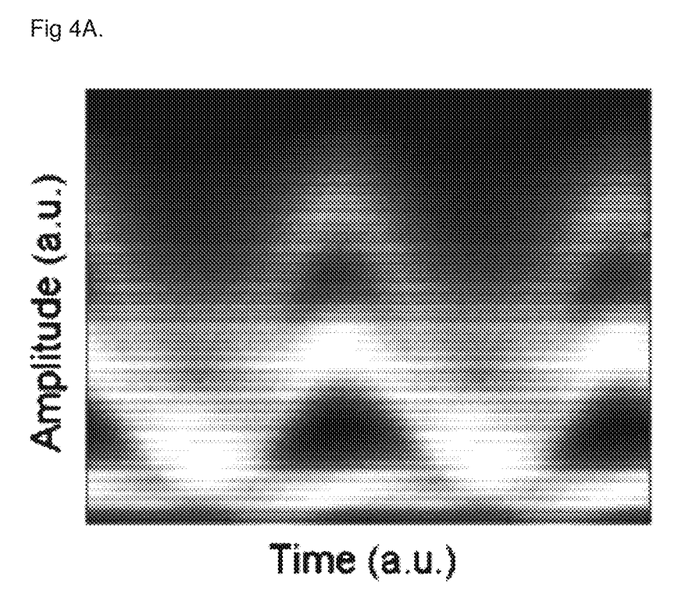
FIGS. 4A and 4B show an eye diagram and a synchronized amplitude histogram of a 16QAM signal to which a software-based synchronization method according to an embodiment of the present invention is applied.
Figure 4B:
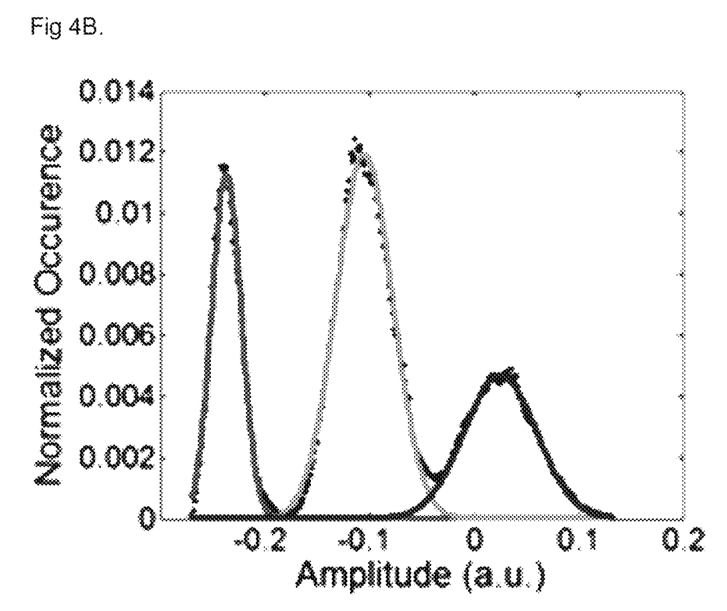

FIGS. 4A and 4B show an eye diagram and a synchronized amplitude histogram of a 16QAM signal to which a software-based synchronization method according to an embodiment of the present invention is applied. FIG. 4A is an eye diagram of a 16QAM signal acquired by rearranging the sampled data in conformity with the symbol period using the clock extracted according to the present method.

Just like the QPSK signal, the sampled data are divided into twenty (20) parts along the time axis of the eye diagram. A synchronized amplitude histogram is acquired through the use of a sample positioned in a central region. FIG. 4B illustrates the synchronized amplitude histogram of the 16QAM signal.

In case of the 16QAM signal, three peaks appear on the amplitude histogram. In order to quantitatively estimate the signal quality using the synchronized amplitude histogram, a Q value is defined by equation 4 through the use of the average and standard deviation of the three peaks on the amplitude histogram:

$$Q = \frac{1}{2} \cdot \left( \frac{|\mu_1 - \mu_2|}{\sigma_1 + \sigma_2} + \frac{|\mu_2 - \mu_3|}{\sigma_2 + \sigma_3} \right)$$

where $\mu_k$ and $\sigma_k$ (k=1, 2, 3, etc.) denote the average and the standard deviation of the first, second and third peaks.

In order to find the Q value defined as above, the respective peaks are first separated from one another. Then, the average and the standard deviation are calculated through the Gaussian approximation. To this end, the amplitude histogram is divided by the number of samples used in the amplitude histogram, thereby normalizing the amplitude histogram.

If the data are assumed to be random, the probabilities of appearance of the first, second and third peaks are 0.25, 0.5 and 0.25, respectively. Thus, the amplitude histogram is integrated from the left side to the right side. The three peaks are separated from one another on the basis of the points where the integral values become equal to 0.25 and 0.75. Then, the average and the standard deviation of the respective peaks are calculated through the Gaussian approximation. Use of the characteristics in which the first peak is smaller in distribution than the remaining peaks makes it easy to separate the first peak even when the optical signal-to-noise ratio is low.

The Gaussian approximation is first performed with respect to the first peak. After the distribution of the Gaussian-approximated first peak is removed from the amplitude histogram, the Gaussian approximation is performed with respect to the second peak. A Gaussian approximation curve for the third peak can be found in a similar manner.

In case of the 16QAM signal, the amplitude in the central region of the eye diagram tends to increase along with the accumulation of the chromatic dispersions. Thus, in case of the 16QAM signal, a chromatic dispersion parameter can be defined by equation 3.

As set forth above, with the optical signal quality monitoring apparatus according to the present invention, a software-based synchronization technology is applied to asynchronously sampled data. This makes it possible to monitor a quality of an optical signal in a cost-effective manner without having to employ a high-speed sampling circuit and a clock-extracting circuit.

Figure 5:
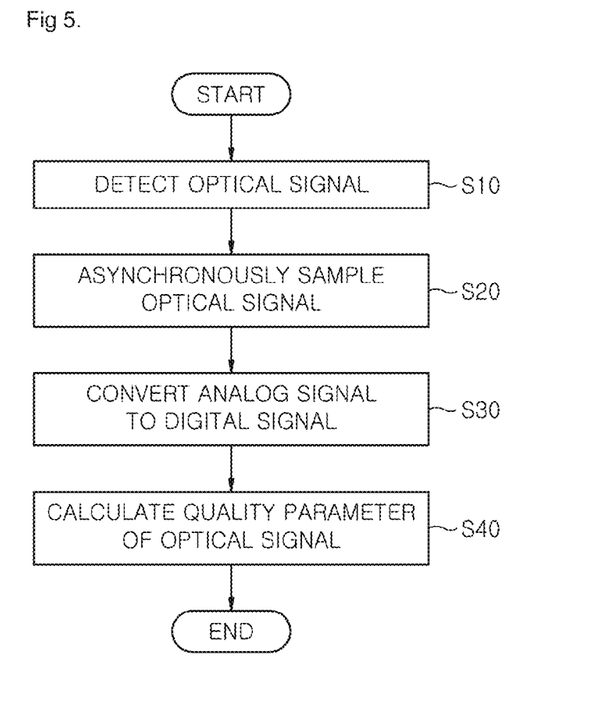
FIG. 5 is a flowchart showing the overall sequence of an optical signal quality monitoring method using a software-based synchronized amplitude histogram according to the present invention.

FIG. 5 is a flowchart showing the overall sequence of an optical signal quality monitoring method using the optical signal quality monitoring apparatus according to the present invention. In the optical signal quality monitoring method, the optical detector 10 performs a step (S10) of directly receiving some of the modulated optical signal and converting the received optical signal to an electric signal.

Figure 6A:
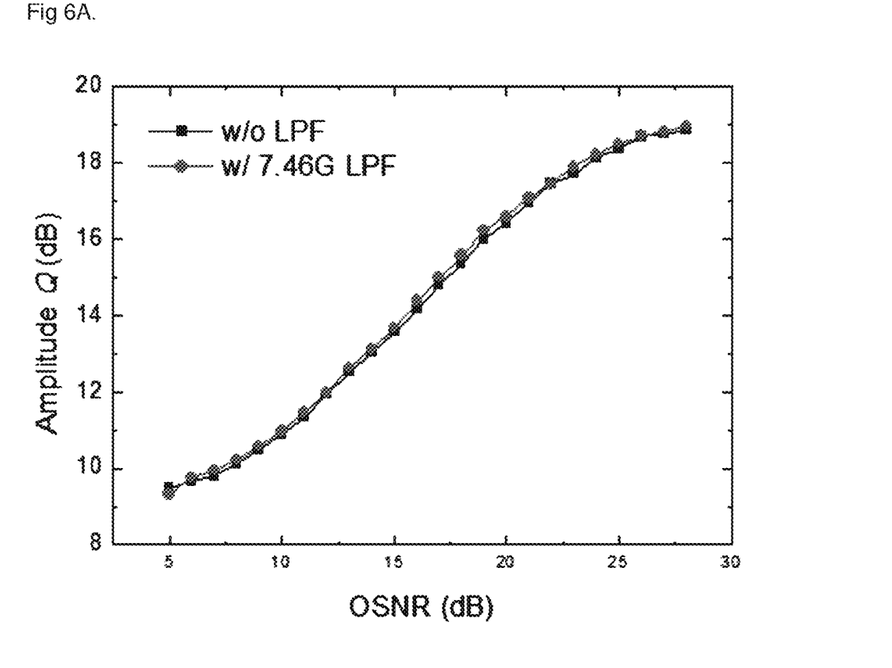
FIGS. 6A and 6B are graphs representing Q values dependent upon an optical signal-to-noise ratio, which are measured with respect to a QPSK signal and a 16QAM signal through the use of the optical signal quality monitoring apparatus using a software-based synchronized amplitude histogram according to the present invention.
Figure 6B:
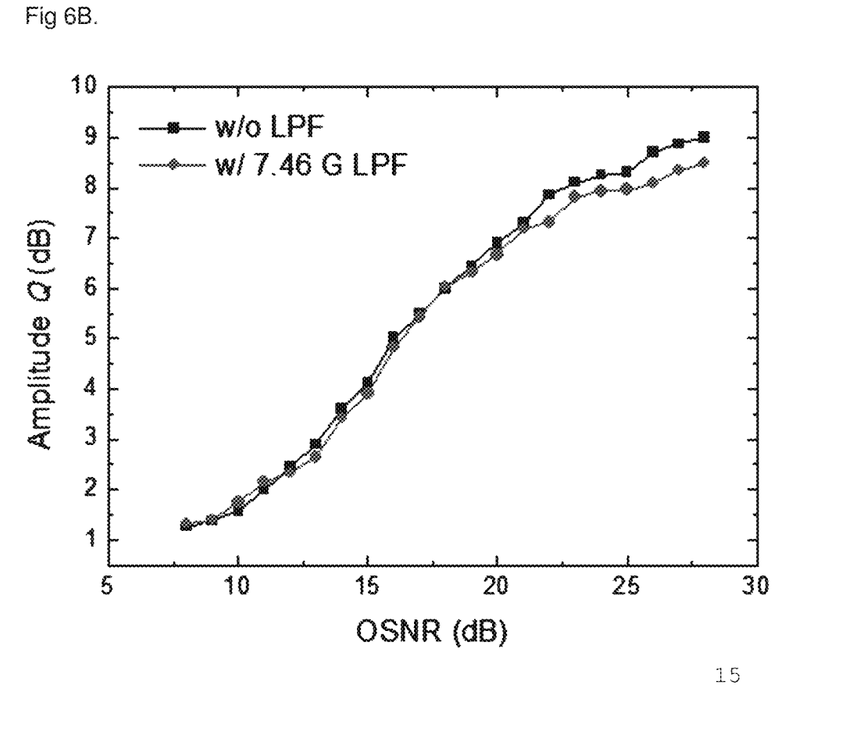

FIGS. 6A and 6B are graphs representing Q values dependent upon an optical signal-to-noise ratio, which are measured with respect to the QPSK signal and the 16QAM signal through the use of the optical signal quality monitoring apparatus using a software-based synchronized amplitude histogram according to the present invention. In this regard, a 20-Gb/s QPSK signal and a 40-Gb/s 16QAM signal are used as the optical signals applied to the optical signal quality monitoring apparatus using a software-based synchronized amplitude histogram according to the present invention.

The 20-Gb/s QPSK signal is modulated by applying two 10-Gb/s NRZ (non-return-to-zero) signals to an IQ modulator. In order to generate the 40-Gb/s 16QAM signal, two 20-Gb/s 4-level signals are applied to the IQ modulator. The optical signal-to-noise ratio is controlled through the use of amplified spontaneous emission (ASE).

A basic optical signal-to-noise ratio for comparison is measured by applying some of the optical signals to an optical spectrum analyzer. The remaining optical signals are applied to the optical signal quality monitoring apparatus 100 according to the present invention.

Next, a step (S20) of asynchronously sampling an optical signal at a low speed is performed through the use of the sample-and-hold amplifier 20. Then, a step (S30) of converting a sampled analog signal to a digital signal is performed through the use of the analog-to-digital converter 30. In the present embodiment, the clock sampling speed of the sample-and-hold amplifier 20 and the analog-to-digital converter 30 is set equal to 25 MS/s.

Figure 7:
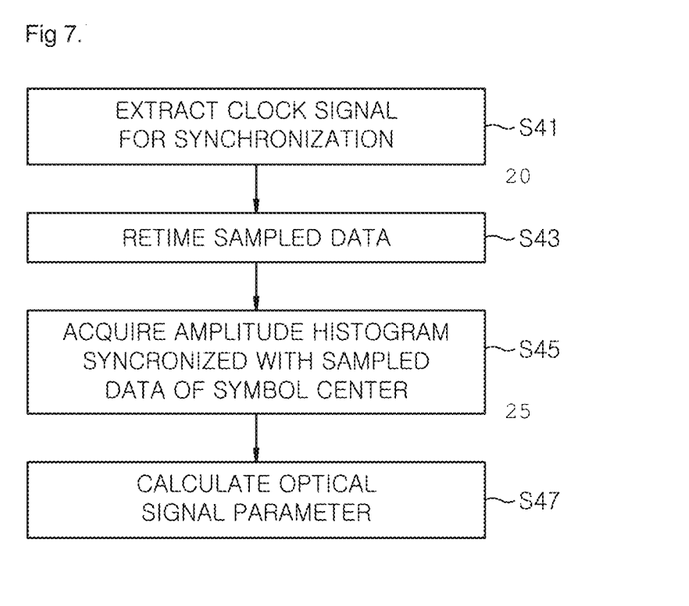
FIG. 7 is a flowchart showing the detailed sequence of step S40 of the optical signal quality monitoring method using a software-based synchronized amplitude histogram according to the present invention.

Then, a step (S40) of generating a synchronized amplitude histogram of sampled data and monitoring an optical signal quality is performed through the use of the digital signal processor 40. In step S40, as illustrated in FIG. 7, a step (S41) of extracting a clock signal in a software-based synchronization method is performed through the use of the clock signal extracting unit 41.

Figure 8:
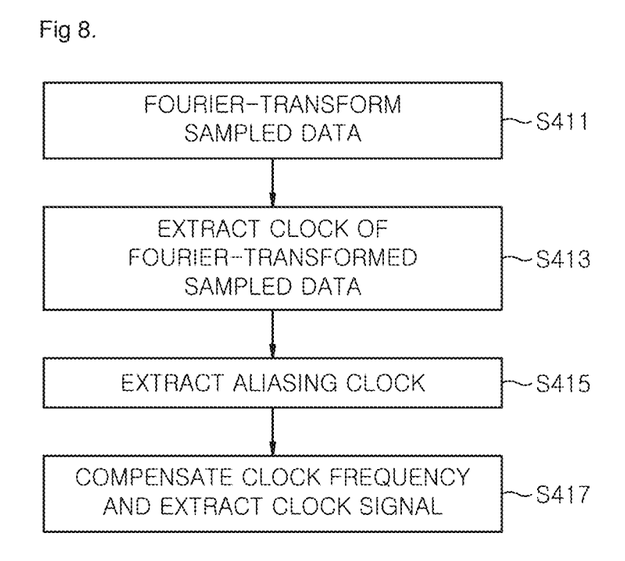
FIG. 8 is a flowchart showing the detailed sequence of step S41 of the optical signal quality monitoring method using a software-based synchronized amplitude histogram according to the present invention.

In step S41, as illustrated in FIG. 8, a step (S411) of Fourier-transforming the data asynchronously sampled in the asynchronous sampling unit and a step (S413) of extracting a clock frequency of the Fourier-transformed data are performed.

Subsequently, a step (S415) of extracting an aliasing clock on an aliasing component generated in a frequency region in step S411 is performed. A step (S417) of extracting a clock signal for synchronization by compensating a difference between a clock frequency $f_p$ of the sampled data and an aliased clock frequency $f_a$ generated in the frequency region is performed.

Next, a step (S43) of retiming and arranging the sampled data so that the sampled data can be inserted into a single symbol period is performed through the use of the retiming-and-arranging unit 42.

Then, a step (S45) of acquiring a synchronized amplitude histogram by excluding the sample acquired in a region where symbol conversion occurs and by using the sampled data positioned in the central region of a symbol is performed through the use of the amplitude histogram acquiring unit 43. A step (S47) of calculating a parameter indicating an optical signal quality by analyzing the distribution of the synchronized amplitude histogram acquired in the amplitude histogram acquiring unit 43 is performed through the use of the quality calculating unit 44.

The black solid lines in FIGS. 6A and 6B indicate the measurement results of the QPSK signal and the 16QAM signal in the present embodiment. It can be seen that the optical signal-to-noise ratios of the QPSK signal and the 16QAM signal can be measured within a range of 5 to 28 dB and within a range of 8 to 28 dB, respectively.

The conventional optical signal quality monitoring method using a non-synchronized amplitude histogram is capable of monitoring a QPSK signal having an optical signal-to-noise ratio of 17 dB or more and a 16QAM signal having an optical signal-to-noise ratio of 20 dB or more. In contrast, the present optical signal quality monitoring method using a synchronized amplitude histogram can monitor a QPSK signal and a 16QAM signal even when an optical signal-to-noise ratio is low.

In an ultra-high-speed transmission system, the band width of a transceiver may be limited depending on the band width of different kinds of electronic elements. If such is the case, the distribution of the non-synchronized amplitude histogram used in the conventional method becomes broader. This may significantly deteriorate the monitoring performance.

However, the present optical signal quality monitoring method using a software-based synchronized amplitude histogram is less susceptible to this problem because data are sampled at the center of a symbol. In order to confirm this characteristic, the influence of the limited band width of an optical transceiver on the performance of the present optical signal quality monitoring method was evaluated. To this end, the band width of an electric drive signal applied to the optical transceiver was limited through the use of a low pass filter. At this time, the 3-dB band width of the low pass filter is 7.46 GHz.

The red solid lines in FIGS. 6A and 6B indicate the measurement results for the QPSK signal and the 16QAM signal. It can be seen that the Q values measured by the present method have little difference regardless of whether the low pass filter is used or not.

Figure 9A:
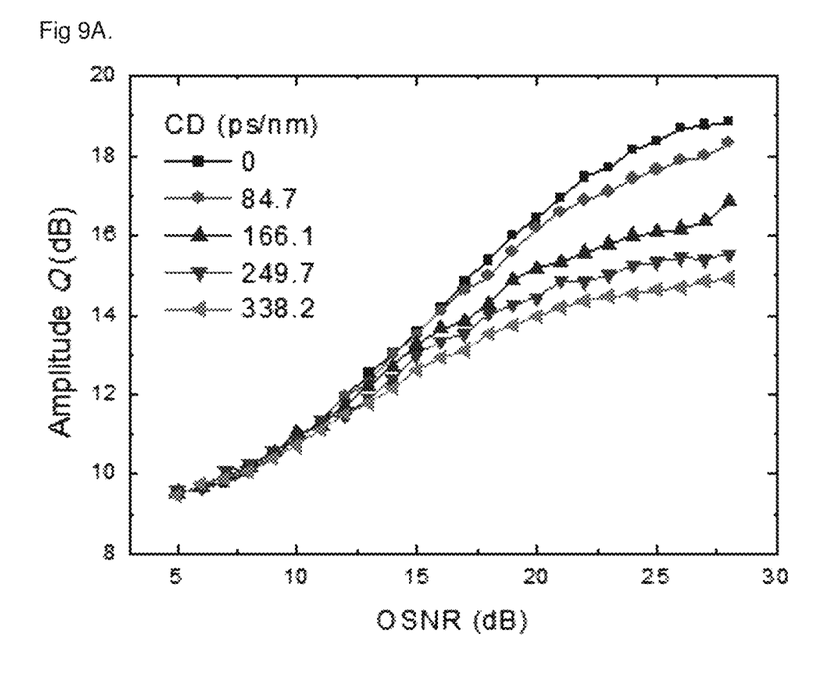
FIGS. 9A and 9B are graphs representing the Q values measured with respect to a QPSK signal and a 16QAM signal by changing an optical signal-to-noise ratio relative to different chromatic dispersion values.
Figure 9B:
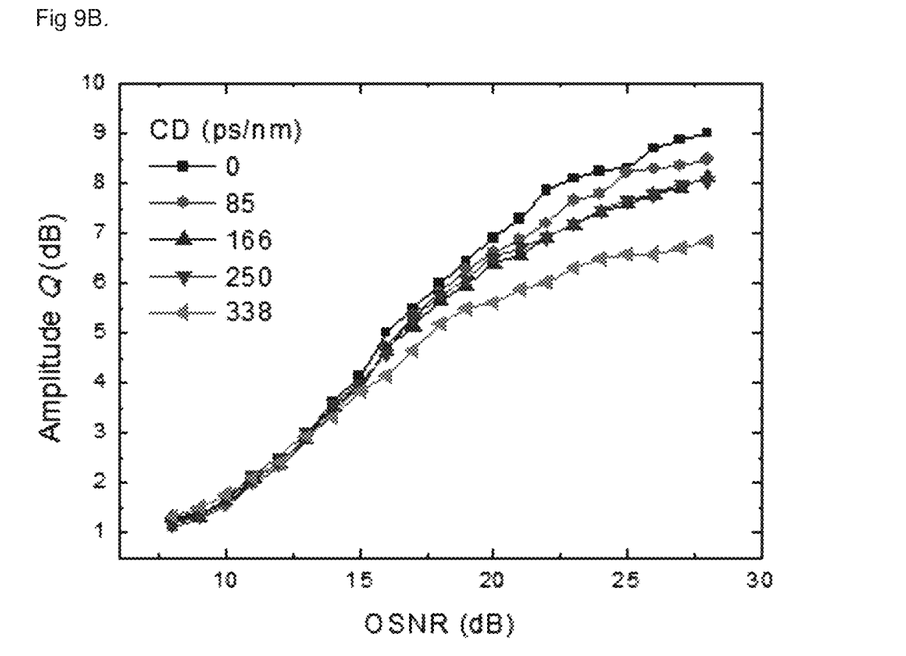

FIGS. 9A and 9B show the influence of a chromatic dispersion on the performance of the present optical signal quality monitoring method using a software-based synchronized amplitude histogram. The measurement results for the QPSK signal and the 16QAM signal are shown in FIGS. 9A and 9B. The Q values were measured by setting the chromatic dispersion within a range of from 0 to 338 ps/nm and changing the optical signal-to-noise ratio.

Referring to FIGS. 9A and 9B, it can be noted that, since the chromatic dispersion tends to disperse an optical pulse, the Q values measured are decreased along with the increase of the chromatic dispersion if the optical signal-to-noise ratio is large. Therefore, if the present optical signal quality monitoring method is used, the optical signal-to-noise ratio estimated becomes lower than the actual one as the chromatic dispersion grows larger.

In case of the QPSK signal, even if the chromatic dispersion is increased to 250 ps/nm when the optical signal-to-noise ratio is 5 to 11 dB, the optical signal-to-noise ratio can be monitored by the present monitoring method at the degree of accuracy of 1 dB or less. In case of the 16QAM signal, even if the chromatic dispersion is increased to 250 ps/nm when the optical signal-to-noise ratio is 8 to 18 dB, the optical signal-to-noise ratio can be monitored by the present monitoring method at the degree of accuracy of 1 dB or less.

Figure 10A:
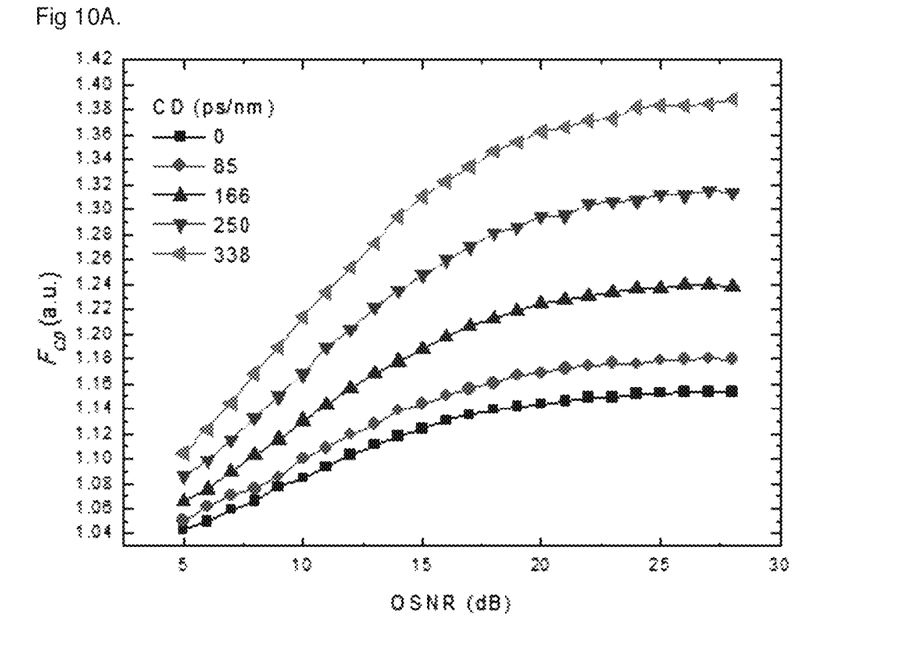
FIGS. 10A and 10B are graphs representing the chromatic dispersion parameter $F_{CD}$ measured with respect to a QPSK signal and a 16QAM signal by changing an optical signal-to-noise ratio relative to different chromatic dispersion values.
Figure 10B:
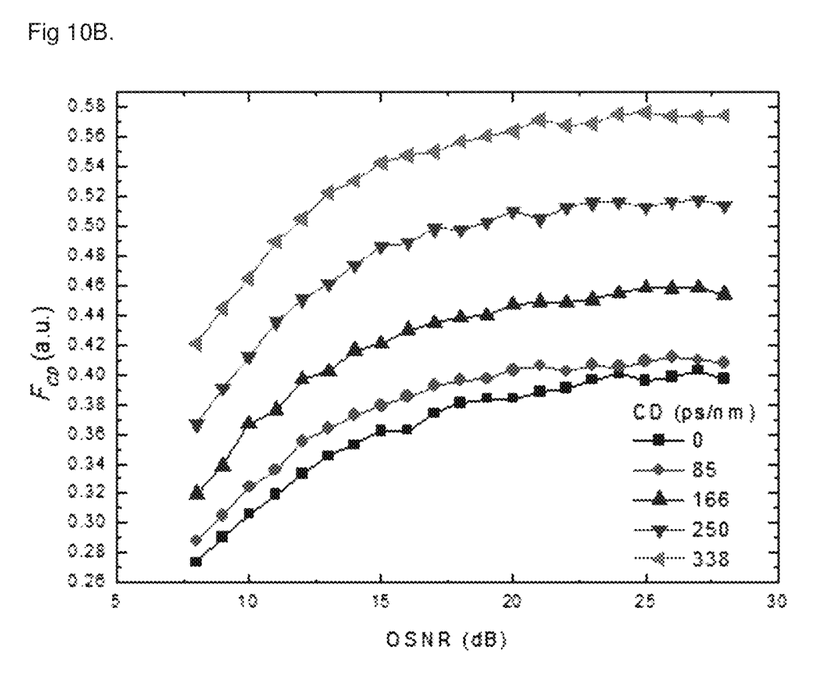

FIGS. 10A and 10B are graphs representing the chromatic dispersion parameter $F_{CD}$ measured with respect to a QPSK signal and a 16QAM signal by changing an optical signal-to-noise ratio relative to different chromatic dispersion values. It can be seen that the amplitude at the center of a symbol and the $F_{CD}$ value are increased along with the accumulation of the chromatic dispersions.

The $F_{CD}$ value is affected not only by the chromatic dispersion but also by the optical signal-to-noise ratio. If the Q value and the $F_{CD}$ value are measured at the same time, it is possible to accurately monitor the optical signal-to-noise ratio and the chromatic dispersion value.

In the meantime, the present optical signal quality monitoring method using a software-based synchronized amplitude histogram can be applied to many different signal modulation methods such as BPSK, QPSK, 16QAM, 32QAM and 64QAM.

As described above, with the optical signal quality monitoring method according to the present invention, it is possible to significantly enhance the monitoring accuracy of an optical signal quality by asynchronously sampling a detected optical signal and then generating a synchronized amplitude histogram.

In the present optical signal quality monitoring method using a software-based synchronized amplitude histogram, the sample-and-hold amplifier 20 and the analog-to-digital converter 30 may be replaced by a sampling oscilloscope. In analyzing the software-based synchronized amplitude histogram, the parameters for use in monitoring the optical signal-to-noise ratio and the chromatic dispersion may be changed depending on the modulation methods of an optical signal and the characteristics of an optical transmission network.

It will be possible for a person skilled in the relevant art to adapt the present optical signal quality monitoring method using a software-based synchronized amplitude histogram to the change of the optical signal modulation method and the optical transmission network. Therefore, no detailed description will be made in this regard.

While certain preferred embodiments of the invention have been described hereinabove, the present invention is not limited to the aforementioned embodiments. The optical signal quality monitoring method and apparatus using a software-based synchronized amplitude histogram can be realized in many different forms without departing from the spirit and scope of the invention.

What is claimed is:

1. An optical signal quality monitoring apparatus, comprising:

an optical detector for directly receiving an optical signal modulated in an optical path and converting the optical signal to an electric signal;

an asynchronous sampling unit for asynchronously sampling the electric signal of the optical detector at a speed lower than a symbol speed of the optical signal; and a digital signal processor for monitoring an optical signal quality by finding a synchronized amplitude histogram of data sampled in the asynchronous sampling unit, wherein the asynchronous sampling unit comprises:

a sample-and-hold amplifier for sampling the electric signal outputted from the optical detector; and an analog-to-digital converter for converting an analog signal sampled in the sample-and-hold amplifier to a digital signal, and wherein the digital signal processor comprises:

a clock signal extracting unit for extracting a clock signal using a software-based synchronization method;

a retiming-and-arranging unit for retiming and arranging sampled data using a clock frequency estimated by the clock signal extracting unit such that the sampled data are inserted into a single symbol period;

an amplitude histogram acquiring unit for acquiring a synchronized amplitude histogram using the sampled data positioned at a central region of a symbol while excluding a sample acquired in a region where symbol conversion occur; and a quality calculating unit for calculating a parameter indicating an optical signal quality by analyzing a distribution of the synchronized amplitude histogram acquired in the amplitude histogram acquiring unit.

2. The apparatus of claim 1, wherein the clock signal extracting unit is configured to extract a clock frequency of the sampled data by Fourier-transforming the data asynchronously sampled in the asynchronous sampling unit and to extract a clock signal for synchronization by compensating a difference between a clock frequency $f_p$ of the sampled data and an aliased clock frequency $f_a$ generated in a frequency region.

3. The apparatus of claim 2, wherein the amplitude histogram acquiring unit is configured to acquire an amplitude histogram synchronized with the sampled data falling within 20% of a total symbol period about a decision time as a symbol center rearranged on an eye diagram.

4. The apparatus of claim 1, wherein the quality calculating unit is configured to calculate a parameter for deciding one or both of an optical signal-to-noise ratio and a chromatic dispersion which are factors deteriorating the optical signal quality.

5. The apparatus of claim 4, wherein, if there exists a single optical signal intensity level, Gaussian-approximation is performed with respect to the peak on the synchronized amplitude histogram, the parameter Q for deciding the optical signal-to-noise ratio defined by a ratio of an average of approximated Gaussian functions to a standard deviation thereof.

6. The apparatus of claim 4, wherein, if there exist two or more optical signal intensity levels whose number is indicated by k, Gaussian approximation is performed with respect to the peaks on the synchronized amplitude histogram having the same number as the number of the optical signal intensity levels, the parameter Q for deciding the optical signal-to-noise ratio defined by:

$$Q = \frac{1}{k-1} \sum_{i=1}^{k-1} \frac{|\mu_i - \mu_{i+1}|}{\sigma_i + \sigma_{i+1}}$$

where $g_1, g_2, \ldots, g_k$ denote Gaussian functions, $\mu_1, \mu_2, \ldots, \mu_k$ signify averages of the Gaussian functions, and $\sigma_1, \sigma_2, \ldots, \sigma_k$ indicate standard deviations of the Gaussian functions.

7. The apparatus of claim 4, wherein the parameter $F_{CD}$ for deciding the chromatic dispersion is defined by a ratio of an average of amplitudes in a central region of the optical signal to an average of amplitudes of the total samples.

8. The apparatus of claim 1, wherein the optical signal is modulated by a modulation method selected from the group consisting of M-ary PSK (M-ary Phase-Shift Keying), M-ary DPSK (M-ary Differential Phase-Shift Keying) and M-ary QAM (M-ary Quadrature Amplitude Modulation).

9. An optical signal quality monitoring method, comprising:
(a) a step of allowing an optical detector to directly receive a modulated optical signal and to convert the optical signal to an electric signal;
(b) a step of allowing an asynchronous sampling unit to asynchronously sample the electric signal; and
(c) a step of allowing a digital signal processor to monitor an optical signal quality by generating a synchronized amplitude histogram of sampled data,
wherein step (b) is performed at a speed lower than a symbol speed of the optical signal, and
wherein step (c) comprises:
(c-1) a step of allowing a clock signal extracting unit to extract a clock signal by a software-based synchronization method;
(c-2) a step of allowing a retiming-and-arranging unit to retime and arrange sampled data using a clock frequency such that the sampled data are inserted into a single symbol period;
(c-3) a step of allowing an amplitude histogram acquiring unit to acquire a synchronized amplitude histogram using the sampled data positioned at a central region of a symbol while excluding a sample acquired in a region where symbol conversion occur; and
(c-4) a step of allowing a quality calculating unit to calculate a parameter indicating an optical signal quality by analyzing a distribution of the synchronized amplitude histogram acquired in the amplitude histogram acquiring unit.

10. The method of claim 9, wherein the step (c-1) comprises:
(c-1-1) a step of Fourier-transforming the data asynchronously sampled in the asynchronous sampling unit;
(c-1-2) a step of extracting a clock frequency of the Fourier-transformed sampled data;
(c-1-3) a step of extracting an aliasing clock on an aliasing component generated in a frequency region in the step (c-1-1); and
(c-1-4) a step of extracting a clock signal for synchronization by compensating a difference between a clock frequency $f_p$ of the sampled data and an aliased clock frequency $f_a$ generated in the frequency region.

11. The method of claim 9, wherein the step (c-3) comprises acquiring an amplitude histogram synchronized with the sampled data falling within 20% of a total symbol period about a decision time as a symbol center rearranged on an eye diagram.

12. The method of claim 9, wherein the step (c-4) comprises calculating a parameter for deciding one or both of an optical signal-to-noise ratio and a chromatic dispersion which are factors deteriorating the optical signal quality.

* * * * *